(12) United States Patent
You et al.

(10) Patent No.: US 9,860,954 B1
(45) Date of Patent: Jan. 2, 2018

(54) AUTOMATIC SENSING SYSTEM AND AUTOMATIC SENSING CONTROL METHOD FOR LED LIGHTING

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Xiaobo You, Zhejiang (CN); Xiaoyong Zhou, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 15/629,687

(22) Filed: Jun. 21, 2017

(30) Foreign Application Priority Data

Jun. 22, 2016 (CN) .......................... 2016 1 0470932

(51) Int. Cl.
*H05B 33/08* (2006.01)
*H05B 37/02* (2006.01)

(52) U.S. Cl.
CPC ..... *H05B 33/0854* (2013.01); *H05B 37/0272* (2013.01)

(58) Field of Classification Search
CPC .. H05B 37/02; H05B 37/029; H05B 37/0227; H05B 37/0272; H05B 33/0854; H05B 33/0866; Y02B 20/48; Y02B 20/46; F21S 2/005; F21S 9/04; F21V 23/0442; F21Y 2115/10

See application file for complete search history.

(56) References Cited

U.S. PATENT DOCUMENTS

| 8,232,745 | B2 * | 7/2012 | Chemel | F21S 9/043 |
| | | | | 315/291 |
| 8,339,069 | B2 * | 12/2012 | Chemel | H05B 37/029 |
| | | | | 315/294 |
| 2017/0127497 | A1 * | 5/2017 | Baek | H05B 37/0218 |

* cited by examiner

*Primary Examiner* — Haissa Philogene
(74) *Attorney, Agent, or Firm* — Wang Law Firm, Inc.

(57) ABSTRACT

An automatic sensing system includes at least one LED lamp, and at least one sensing control device. Each of at least one LED lamp includes at least three operation modes. The three operation modes includes a closing mode, a low light mode, and a fill light mode. The sensing control device includes an illumination detecting module, a pyroelectric sensing module, a signal processing module, and a lamp control module. The signal processing module is configured for processing the signal data output from the pyroelectric sensing module based on the signal data detected by the illumination detecting module and outputting a control signal. The lamp control module is configured for controlling all of the LED lamps to work in one of the three operation modes so as to make any one of the at least one sensing control device to control all of the LED lamps to work. The invention further includes an automatic sensing control method for LED lighting.

10 Claims, 2 Drawing Sheets

AUTOMATIC SENSING SYSTEM AND AUTOMATIC SENSING CONTROL METHOD FOR LED LIGHTING

RELATED APPLICATION

This present application claims benefit of the Chinese Application CN 201610470932.1, filed on Jun. 22, 2016.

BACKGROUND

1. Technical Field

The present application relates to a lighting controlling device, and more particularly to an automatic sensing system and an automatic sensing control method for LED lighting.

2. Description of the Related Art

Light emitting diode (LED) is growing in popularity due to decreasing costs and long life compared to incandescent lighting and fluorescent lighting. Recently, a number of LED lighting apparatuses have been designed to replace the halogen apparatus, as well as other traditional incandescent or fluorescence lighting apparatuses. In some places such as exhibition halls, jewelry stores, museums, supermarkets, and some home lighting, such as large villas, will use a lot of strip LED lamps. Moreover, in addition to lighting equipments, such as general traffic lights, billboards, motor-lights, etc., also use light-emitting diodes as light source. As described above, for the light-emitting diodes as a light source, the advantage is power saving, and the greater brightness. Therefore, the use has been gradually common.

Since the pace of life in modern society is getting faster and faster, people are increasingly in need of more simple control of lighting equipment so as to obtain a comfortable life and more sensitive more lighting. Therefore, the home intelligent control lighting system is more and more used. However, the current home intelligent control system generally requires the user via a remote controller to continuously adjust brightness for changing the corresponding brightness of the lamp or continuously adjust color temperature for switching between the cool color and the warm color so as to achieve best lighting effect. As a result, the intelligent control device of the home intelligent control lighting system in the prior art has a problem of complicated operation and is not conducive to large-scale use in the general user base.

Therefore, it is necessary to provide an automatic sensing system and an automatic sensing control method for LED lighting which makes it possible to simply operate.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The present application is illustrated by way of example and not by way of limitation in the figures of the accompanying drawings. It should be noted that references to "an" or "one" embodiment in this application are not necessarily to the same embodiment, and such references mean at least one.

Figure 1:
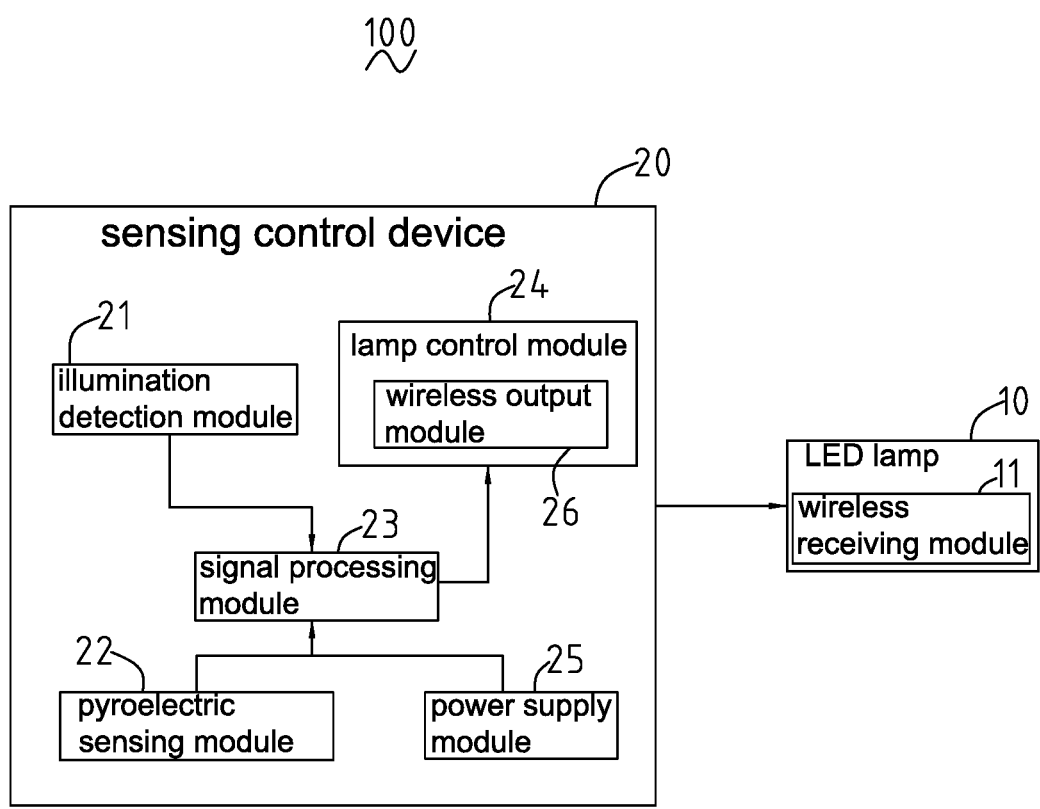
FIG. 1 is a block diagram of an automatic sensing system for LED lighting according to an embodiment.
Figure 2:
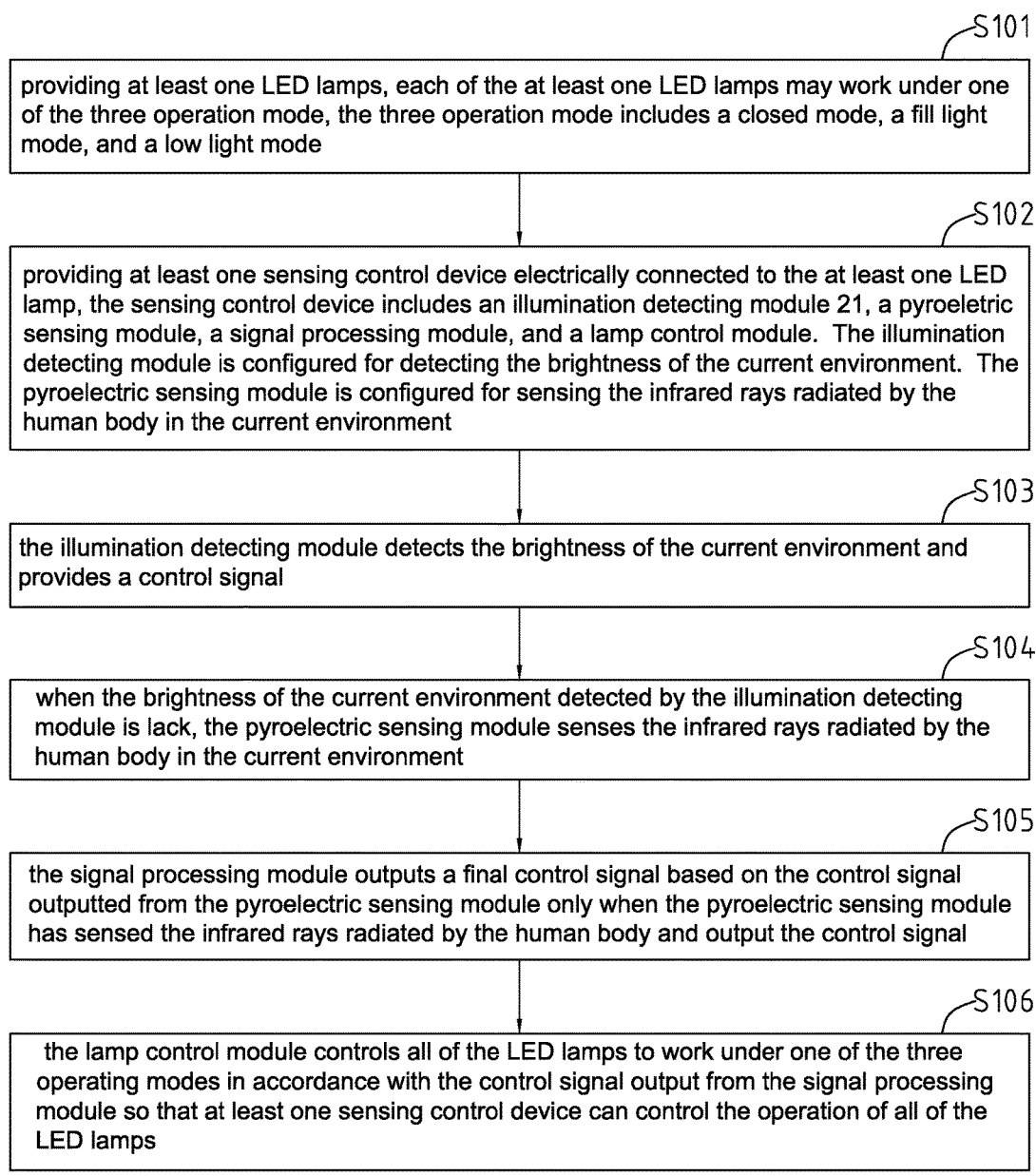
FIG. 2 is a flow chart of an automatic sensing control method for LED lighting according to an embodiment.

Referring to FIG. 1, an automatic sensing system 100 for LED lighting is shown. The automatic sensing system for LED lighting 100 includes at least one LED lamp 10, and at least one sensing control device 20 electrically connected to the at least one LED lamp 10 and configured for controlling the at least one LED lamp 10. It can be understood that the automatic sensing system 100 for LED lighting further includes other function modules, such as power supply module, switch module, wires, and so on, which is well known for these persons skilled in the art and not described in detail.

The LED lamp 10 may be a lamp set independently in the illumination system and may be a ceiling lamp, either a wall washer, or a lawn lamp, which may include multiple, such as three, five or more, or only one. The LED lamp 10 belongs to the prior art and is known to those skilled in the art and will not be described here. It is need to further explain that since lamps will usually start to supplement the illumination when brightness are in the lack, it is first necessary to classify the brightness so as to achieve the purpose of automatic control. That is to say, the LED lamp 10 will be operated in different operating modes at different brightness levels. In the present embodiment, the brightness level includes three stages. The brightness of the first stage is greater than 200 lumens, the brightness of the second stage is less than 200 lumens and greater than 1 lumen, and the brightness level of the third stage is less than 1 lumen. At the first stage, it is generally considered that the brightness is sufficient and the LED lamp 10 is not required to work or operate. And in the second stage, the brightness is not sufficient, it is need the LED lamp 10 to work to compensate for the brightness when need to turn on the LED lamp 10. Finally, in the third stage, it may be regarded that it is no light into the night in the current environment, and the LED lamp 10 should work in low light mode. That is, only a slight brightness is issued to avoid irritating the human eye. Therefore, the LED lamp 10 can be operated in at least three operation modes. The at least three operation modes includes a closed mode, a low light mode, and a fill light mode.

The sensing control device 20 includes an illumination detection module 21, a pyroelectric sensing module 22, a signal processing module 23, and a lamp control module 24. The illumination detection module 21 is configured for detecting brightness of the current environment. The pyroelectric sensing module 22 is configured for sensing the infrared rays radiated by the human body in the current environment. The signal processing module 23 is configured for processing the signal data sensed by the pyroelectric sensing module 22 in accordance with the signal data detected by the illumination detection module 21 and outputting control signal. The lamp control module 24 is configured for controlling the LED lamp 10 to work in one mode of the three operation modes according to the control signal from the signal processing module 23. It is to be understood that the structure, the operating principle and the electrical connection method of the illumination detection module 21, the pyroelectric sensing module 22, the signal processing module 23, and the lamp control module 24 should be known to those skilled in the art. In the normal operating state, the illumination detection module 21 always detects the brightness of the current environment, and outputs the control signal according to the brightness level of the current environment. That is to say, when the brightness is at the first stage, a closing signal is outputted, and when the brightness is at the other stages, a turning-on signal is outputted. The pyroelectric sensing module 22 starts to sense whether or not someone is present in the current environment, that is, whether or not the infrared ray is radiated, only when the turning-on signal of the illumination detection module 21 is received thereby. When someone presents in the current environment, the pyroelectric sensing module 22 will output the control signal so that all of the LED lamps 10 are operated in the fill light mode or the low light mode. Therefore, the signal processing module 22 processes the control signal outputted from the pyroelectric sensing module 22 and outputs control signal to control the lamp control module 24 only when the illumination detection module 21 outputs the turning on signal. However, when the illumination detection module 21 outputs the tuning off signal, the signal processing module 23 will immediately output control signal to the lamp control module 24 so as to control all of the LED lamps 10 to work in the closed mode. It can be understood that it is possible to use a plurality of the sensing control devices 20 in some commercial lighting or large room of home lighting. When a plurality of sensing control devices 20 are provided, the respective sensing control devices 20 should be independent and non-interference with each other. However, any one of the plurality of sensing control devices 20 can control the work state of all of the plurality of LED lamps 10. That is to say, as long as one of the plurality of sensing control devices 20 output control signal, it is possible to control all of the LED lamps 10 in the automatic sensing system 100 to work under one of the three operation modes. In the present embodiment, only one sensing control device 20 as an example is presented to illustrate the operation of the present invention.

Each of the sensing control devices 20 may further include a power supply module 25. The power supply module 25 is used to provide power for the entire sensing control devices 20 so that the sensing control devices 20 has energy to run. Each of the sensing control devices 20 may further include a wireless output module 26 which outputs a wireless signal based on the control signal of the lamp control module 24. The LED lamps 10 may also include a wireless receiving module 11 which receives the wireless signal output from the wireless output module 26 and controls the working state of the LED lamp 10. The wireless signal may be a WIFI signal or a Bluetooth signal. Moreover, the sensing control device 20 may also transmit the control signal via a wire.

As described above, the automatic sensing system for LED lighting 100 control the operation mode of the LED lamps 10 according to the brightness level of the current environment and whether or not someone is in the environment. Moreover, only when the current brightness level of the environment need to turn on the lights, the sensing control device 20 will be to detect whether someone is in the current environment. As a result, it can achieve the purpose of automatic sensing and energy saving.

The present invention further provides an automatic sensing control method for LED lighting, the method includes the following steps:

S101: providing at least one LED lamps 10, each of the at least one LED lamps 10 may work under one of the three operation mode, the three operation mode includes a closed mode, a fill light mode, and a low light mode;

S102: providing at least one sensing control device 20 electrically connected to the at least one LED lamp 10, the sensing control device 20 includes an illumination detecting module 21, a pyroelectric sensing module 22, a signal processing module 23, and a lamp control module 24. The illumination detecting module 21 is configured for detecting the brightness of the current environment. The pyroelectric sensing module 22 is configured for sensing the infrared rays radiated by the human body in the current environment;

S103: the illumination detecting module 22 detects the brightness of the current environment and provides a control signal;

S104: when the brightness of the current environment detected by the illumination detecting module 22 is lack, the pyroelectric sensing module 22 senses the infrared rays radiated by the human body in the current environment;

S105: the signal processing module 23 outputs a final control signal based on the control signal outputted from the pyroelectric sensing module only when the pyroelectric sensing module 22 has sensed the infrared rays radiated by the human body and output the control signal; and S106: the lamp control module 24 controls all of the LED lamps 10 to work under one of the three operating modes in accordance with the control signal output from the signal processing module 23 so that at least one sensing control device 20 can control the operation of all of the LED lamps 10.

In step S103, the illumination detecting module 21 provides different control signal in accordance with the brightness level of the current environment. As described above, the brightness level includes three stages. The brightness of the first stage is greater than 200 lumens, the brightness of the second stage is less than 200 lumens and greater than 1 lumen, and the brightness level of the third stage is less than 1 lumen. In the first stage, the illumination detecting module 21 outputs a signal of stopping working. In the second stage, the illumination detecting module 21 outputs a signal of filling light. In the third stage, the illumination detecting module 21 outputs a signal of turning on the low light mode.

In step S106, when the brightness level of the current environment is the first stage, the signal processing module 23 outputs a control signal for closing all of the LED lamps 10 after stopping the pyroelectric sensing module 22 output control signal according to the control signal output from the illumination detecting module 21. The lamp control module 24 make all of the LED lamps 10 work in the closing mode according to the control signal output from the signal processing module 23.

In step S105, when the brightness level of the current environment is the second stage, the signal processing module 23 outputs, based on the fill light operation signal output from the illumination detecting module 21 and control signal output from the pyroelectric sensing module 22, control signal. The lamp control module 24 make all of the LED lamps 10 work in the fill light mode according to the control signal output from the signal processing module 23.

In step S105, when the brightness level of the current environment is the third stage, the signal processing module 23 outputs, based on the low light operation signal output from the illumination detecting module 21 and control signal output from the pyroelectric sensing module 22, control signal. The lamp control module 24 make all of the LED lamps 10 work in the low light mode according to the control signal output from the signal processing module 23.

While the disclosure has been described by way of example and in terms of exemplary embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An automatic sensing system for LED lighting, comprising:
   at least one LED lamp, each of at least one LED lamp comprising at least three operation modes, the three operation modes comprising a closing mode, a low light mode, and a fill light mode;
   at least one sensing control device electrically connected to the LED lamp and configured for controlling the LED lamp to work in one of the three operation modes, the sensing control device comprising an illumination detecting module, a pyroelectric sensing module, a signal processing module, and a lamp control module, the illumination detecting module being configured for detecting brightness of a current environment, the pyroelectric sensing module being configured for sensing infrared rays radiated by human body in the current environment, the signal processing module being configured for processing a signal data output from the pyroelectric sensing module based on the signal data detected by the illumination detecting module and outputting a control signal, the lamp control module being configured for controlling all of the LED lamps to work in one of the three operation modes so as to make any one of the at least one sensing control device to control all of the LED lamps to work.

2. The automatic sensing system for LED lighting as claimed in claim 1, wherein each of the at least one sensing control device further comprises a power supply module, the power supply module is used to supply power for the entire power supply module.

3. The automatic sensing system for LED lighting as claimed in claim 2, wherein each of the at least one sensing control device further comprises a wireless output module, the wireless output module outputs wireless signal based on the control signal of the lamp control module, each of the LED lamps further comprises a wireless receiving module, the wireless receiving module receives the wireless signal output from the wireless output module and controls the working state of the LED lamp.

4. The automatic sensing system for LED lighting as claimed in claim 3, wherein the wireless is a WIFI signal or a Bluetooth signal.

5. The automatic sensing system for LED lighting as claimed in claim 1, wherein the illumination detecting module provides different signal based on the different brightness level of the current environment, the brightness level comprises three stages, the brightness of the first stage is greater than 200 lumens, the brightness of the second stage is less than 200 lumens and greater than 1 lumen, and the brightness level of the third stage is less than 1 lumen, in the first stage the illumination detecting module output a signal of stopping working, in the second stage, the illumination detecting module outputs a signal of filling light, in the third stage, the illumination detecting module outputs a signal of turning on the low light mode.

6. An automatic sensing control method for LED lighting comprising the following steps:
   providing at least one LED lamp, each of the at least one LED lamp comprising a closing mode, a low light mode, and a fill light mode;
   providing at least one sensing control device electrically connected to the LED lamp, the sensing control device comprising an illumination detecting module, a pyroelectric sensing module, a signal processing module, and a lamp control module, the illumination detecting module being configured for detecting brightness of a current environment, the pyroelectric sensing module being configured for sensing infrared rays radiated by a human body in the current environment;
   detecting by the illumination detecting module the brightness of the current environment and providing a control signal;
   when the brightness of the current environment detected by the illumination detecting module is lack, sensing by the pyroelectric sensing module the infrared rays radiated by the human body in the current environment;
   outputting by the signal processing module a final control signal based on the control signal outputted from the pyroelectric sensing module only when the pyroelectric sensing module has sensed the infrared rays radiated by the human body and output the control signal;
   controlling by the lamp control module all of the LED lamps to work under one of the three operating modes in accordance with the control signal output from the signal processing module so that at least one sensing control device (20) controls the operation of all of the LED lamps.

7. The automatic sensing control method for LED lighting as claimed in claim 6, wherein the illumination detecting module provides different signal based on the different brightness level of the current environment, the brightness level comprises three stages, the brightness of the first stage is greater than 200 lumens, the brightness of the second stage is less than 200 lumens and greater than 1 lumen, and the brightness level of the third stage is less than 1 lumen, in the first stage the illumination detecting module output a signal of stopping working, in the second stage, the illumination detecting module outputs a signal of filling light, in the third stage, the illumination detecting module outputs a signal of turning on the low light mode.

8. The automatic sensing control method for LED lighting as claimed in claim 7, wherein when the brightness level of the current environment is the first stage, the signal processing module outputs a control signal for closing all of the LED lamps after stopping the pyroelectric sensing module output control signal according to the control signal output from the illumination detecting module the lamp control module make all of the LED lamps work in the closing mode according to the control signal output from the signal processing module.

9. The automatic sensing control method for LED lighting as claimed in claim 7, wherein when the brightness level of the current environment is the second stage, the signal processing module outputs, based on the fill light operation signal output from the illumination detecting module and control signal output from the pyroelectric sensing module, control signal, the lamp control module make all of the LED lamps work in the fill light mode according to the control signal output from the signal processing module.

10. The automatic sensing control method for LED lighting as claimed in claim 7, wherein when the brightness level of the current environment is the third stage, the signal processing module outputs, based on the low light operation signal output from the illumination detecting module and control signal output from the pyroelectric sensing module, control signal, the lamp control module make all of the LED lamps work in the low light mode according to the control signal output from the signal processing module.

* * * * *